(12) United States Patent
Kim et al.

(10) Patent No.: US 9,411,479 B2
(45) Date of Patent: Aug. 9, 2016

(54) TOUCH PANEL INCLUDING TOUCH SENSOR

(71) Applicant: Samsung Display Co., Ltd., Yongin, Gyeonggi-Do (KR)

(72) Inventors: Tae Joon Kim, Seongnam-si (KR); Byung-Jun Lee, Seoul (KR); Kwan Young Han, Seongnam-si (KR); Hwan-Hee Jeong, Cheonan-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 2 days.

(21) Appl. No.: 14/458,934

(22) Filed: Aug. 13, 2014

(65) Prior Publication Data

US 2015/0287381 A1 Oct. 8, 2015

(30) Foreign Application Priority Data

Apr. 8, 2014 (KR) .......................... 10-2014-0041624

(51) Int. Cl.
*G06F 3/041* (2006.01)
*G06F 3/044* (2006.01)
*G09G 3/32* (2016.01)

(52) U.S. Cl.
CPC .............. *G06F 3/044* (2013.01); *G09G 3/3233* (2013.01)

(58) Field of Classification Search
None
See application file for complete search history.

(56) References Cited

U.S. PATENT DOCUMENTS

| 6,323,846 | B1 | 11/2001 | Westerman et al. |
|---|---|---|---|
| 8,411,045 | B2 | 4/2013 | Futter |
| 2006/0097991 | A1 | 5/2006 | Hotelling et al. |
| 2010/0149125 | A1 | 6/2010 | Klinghult et al. |
| 2011/0084929 | A1 | 4/2011 | Chang et al. |
| 2012/0113047 | A1 | 5/2012 | Hanauer et al. |
| 2013/0207923 | A1 | 8/2013 | Mohindra et al. |
| 2014/0253499 | A1* | 9/2014 | Lee .......................... G06F 3/044 345/174 |
| 2015/0075959 | A1* | 3/2015 | Lu .......................... G06F 3/0416 200/5 R |

FOREIGN PATENT DOCUMENTS

JP 2013-152561 A 8/2013
KR 10-2013-0044267 A 5/2013

* cited by examiner

*Primary Examiner* — Joseph Haley
(74) *Attorney, Agent, or Firm* — Knobbe Martens Olson & Bear LLP (57) ABSTRACT

A touch panel including a touch sensor is disclosed. In one aspect, the touch panel includes a substrate, a first touch electrode layer and a second touch electrode layer formed over the substrate and an insulating layer interposed between the first and second touch electrode layers. The first touch electrode layer includes a plurality of first touch electrodes each configured to independently receive a driving signal. Each of the first touch electrodes includes a plurality of sub-electrodes arranged at a predetermined interval and a plurality of sub-electrode connectors electrically connecting the sub-electrodes to each other.

19 Claims, 11 Drawing Sheets

TOUCH PANEL INCLUDING TOUCH SENSOR

INCORPORATION BY REFERENCE TO ANY PRIORITY APPLICATIONS

This application claims priority to and the benefit of Korean Patent Application No. 10-2014-0041624 filed in the Korean Intellectual Property Office on Apr. 8, 2014, the entire contents of which are incorporated herein by reference.

BACKGROUND

1. Field

The described technology generally relates to a touch panel including a touch sensor.

2. Description of the Related Technology

Flat panel displays (FPDs) such as organic light-emitting diode (OLED) displays, liquid crystal displays (LCDs), and electrophoretic displays (EPDs) include a field generating electrode and an electro-optical active layer. Each FPD type includes a different electro-optical active layer; OLED displays include an organic emission layer, LCDs include a liquid crystal layer, and EPDs include particles having a charge. The field generating electrode receives a data signal via a switching element such as a thin film transistor and the electro-optical active layer displays an image by converting the data signal into an optical signal.

Recently, display devices have additionally included a touch sensing function as well as the standard displaying function in order to be capable of interactions with a user. The touch sensing function determines whether a user's finger or other input device touches a screen and the touch position information thereof by sensing a change in pressure, light, etc., that occurs at the screen of the display device when the user contacts the screen. The display device can receive an image signal based on the sensed touch information.

SUMMARY OF CERTAIN INVENTIVE ASPECTS

One inventive aspect is a touch panel that can be driven by both a mutual capacitance type and a self-capacitance type driving method and including a touch sensor having a touch electrode structure capable of sensing a multi-touch in the two touch sensor types.

Another aspect is a touch panel including a touch sensor having a touch electrode structure capable of preventing coupling between touch electrodes.

Another aspect is a touch panel including a touch sensor in which a touch sensing region is substantially uniformly distributed.

Another aspect is touch panel including a substrate; a first touch electrode layer and a second touch electrode layer positioned on the substrate; and an insulating layer positioned between the first and second touch electrode layers. The first touch electrode layer includes a plurality of first touch electrodes capable of independently receiving a signal, and each first touch electrode includes a plurality of sub-electrodes formed at predetermined intervals and a plurality of connections connecting the sub-electrodes to each other.

The second touch electrode layer may include a plurality of second touch electrodes, and each second touch electrode may include first electrodes connected to each other in a first direction and second electrodes connected to each other in a second direction.

The first direction is a row direction, the first electrodes connected in the first direction form an electrode row, the second direction may be a column direction substantially perpendicular to the first direction, the second electrodes connected in the second direction form an electrode column, and the second electrode layer may include a plurality of electrode rows and a plurality of electrode columns crossing each other while being insulated from each other.

The second touch electrode may include an opening where an electrode is not formed.

The sub-electrode of the first touch electrode and the opening of the second touch electrode may overlap.

An area of the opening may be greater than an area of the sub-electrode.

The sub-electrodes of the first touch electrode and the second touch electrode may correspond at a ratio of 1:1.

A touch signal line may be connected for each first touch electrode of the first touch electrode layer. Each touch signal line connected to each first touch electrode may transmit a sensing input signal and a sensing output signal.

A touch signal line may be connected for each electrode row of the second touch electrode layer and each electrode column.

The touch signal line connected to the electrode row may transmit a sensing input signal, and the touch signal line connected to the electrode column may transmit a sensing output signal.

The sub-electrode is formed substantially as a rectangle or a right triangle, and intervals between the sub-electrodes may be substantially the same.

The connections may be formed with the same layer as the first touch electrode, and may be formed of the same material as the first touch electrodes.

The second touch electrode may be formed substantially as a rectangle or a right triangle, and intervals between the second touch electrodes may be substantially the same.

The first electrodes connected to each other in the first direction may be connected by first connections positioned at the same layer as the first electrode, and the second electrodes connected to each other in the second direction may be connected by second connections positioned to be insulated from the first connections.

The second connections may be positioned at the same layer as the first touch electrodes, and may be formed of the same material as the first touch electrodes.

The second connection may be electrically connected to the second electrode through a contact hole formed in the insulating layer.

The touch panel may include a lower substrate, an upper substrate, and a display layer positioned between the lower substrate and the upper substrate, and the substrate on which the touch electrode layer is positioned is the upper substrate.

Another aspect is a touch panel comprising a substrate; a first touch electrode layer and a second touch electrode layer formed over the substrate; and an insulating layer interposed between the first and second touch electrode layers, wherein the first touch electrode layer includes a plurality of first touch electrodes each configured to independently receive a driving signal and wherein each of the first touch electrodes includes a plurality of sub-electrodes arranged at a predetermined interval and a plurality of sub-electrode connectors electrically connecting the sub-electrodes to each other.

The second touch electrode layer can include a plurality of second touch electrodes and the second touch electrode can include a plurality of first electrodes electrically connected to each other in a first direction and a plurality of second electrodes electrically connected to each other in a second direction crossing the first direction. The first electrodes can be arranged in a plurality of rows extending in the first direction, the second electrodes can be arranged in a plurality of columns extending in the second direction and the first and second electrodes can be electrically insulated from each other. Each of the second touch electrodes can define an opening therein. Each of the sub-electrodes of the first touch electrodes can overlap a corresponding one of the openings of the second touch electrodes. The area defined by each of the openings can be greater than the area of each of the sub-electrodes. The number of the sub-electrodes of the first touch electrodes can be the same as the number of the second touch electrodes. The touch panel can further comprise a plurality of first touch signal lines respectively electrically connected to the first touch electrodes. Each of the first touch signal lines can be configured to transmit a sensing input signal to the corresponding first touch electrode and receive a sensing output signal from the corresponding first touch electrode.

The touch panel can further comprise a plurality of second touch signal lines respectively electrically connected to the second electrode columns and a plurality of third touch signal lines respectively electrically connected to the first electrode rows. The third touch signal lines can be configured to transmit a plurality of sensing input signals and the second touch signal lines can be configured to receive a plurality of sensing output signals. Each of the sub-electrodes can have a substantially rectangular or triangular shape and the intervals between the sub-electrodes can be substantially the same. Each of the sub-electrode connectors can be formed in the same layer as the first touch electrodes and can be formed of the same material as the first touch electrodes. Each of the second touch electrodes can have a substantially rectangular or triangular shape and the intervals between the second touch electrodes can be substantially the same. The first electrodes can be electrically connected to each other via a plurality of first connectors formed in the same layer as the first electrodes and the second electrodes can be electrically connected to each other via a plurality of second connectors electrically insulated from the first connectors. The second connectors can be formed in the same layer as the first touch electrodes and can be formed of the same material as the first touch electrodes. The second connectors can be electrically connected to the second electrodes via a plurality of contact holes formed in the insulating layer. The touch panel can further comprise a base substrate formed below the substrate and a display layer interposed between the base substrate and the substrate.

Another aspect is a display device, comprising a display panel; and a touch panel formed over the display panel, wherein the touch panel includes: a substrate; a plurality of first touch electrodes formed over the substrate wherein each of the first touch electrodes is configured to receive a first input signal and output a first output signal; and a plurality of second and third touch electrodes formed over the first touch electrodes, wherein the second touch electrodes are configured to receive a second input signal and wherein the thirst touch electrodes are configured to output a second output signal.

Each of the first touch electrodes can comprise a plurality of sub-electrodes electrically connected to each other, wherein each of the second and third touch electrodes can define an opening and wherein each of the openings overlaps one of the sub-electrodes.

The touch panel according to at least one embodiment can be driven with the mutual capacitance method and/or the self-capacitance method and can sense multi-touch input by each of the two methods.

Further, coupling between the touch electrodes positioned at different layers can be reduced and a touch input received from a pointed object such as a stylus can be sensed throughout the entire region of the touch area.

DETAILED DESCRIPTION OF CERTAIN INVENTIVE EMBODIMENTS

Touch sensors including a touch electrode are used in FPDs to sense touch input. For example, in a capacitance type touch sensor, a plurality of touch electrodes are connected to each other forming a plurality of touch electrode rows and a plurality of touch electrode columns that are insulated from each other. A driving signal is applied to each touch electrode row and each touch electrode column through a touch signal line. The touch sensor drives the touch electrode rows and columns using a mutual capacitance formed between the touch electrode rows and columns, or using self-capacitance independently formed by the touch electrode rows and columns, respectively. However, when driving the touch sensor formed of the touch electrode rows and columns with the self-capacitance method, the touch sensor is sequentially driven by units of the electrode rows and columns, thereby generating ghost touch signals in the sensing output. Accordingly, multi-touch input cannot be accurately sensed due to the generated ghost touch signals.

Throughout the specification a panel including a touch sensor is referred to as a touch panel. Further, a display panel including a touch sensor is also referred to as a touch panel.

In the following detailed description, only certain exemplary embodiments have been shown and described, simply by way of illustration. As those skilled in the art would realize, the described embodiments may be modified in various different ways, all without departing from the spirit or scope of the described technology.

In the drawings, the thicknesses of layers, films, panels, regions, etc., may be exaggerated for the sake of clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A touch panel including a touch sensor according to an exemplary embodiment will now be described with reference to accompanying drawings.

Figure 1:
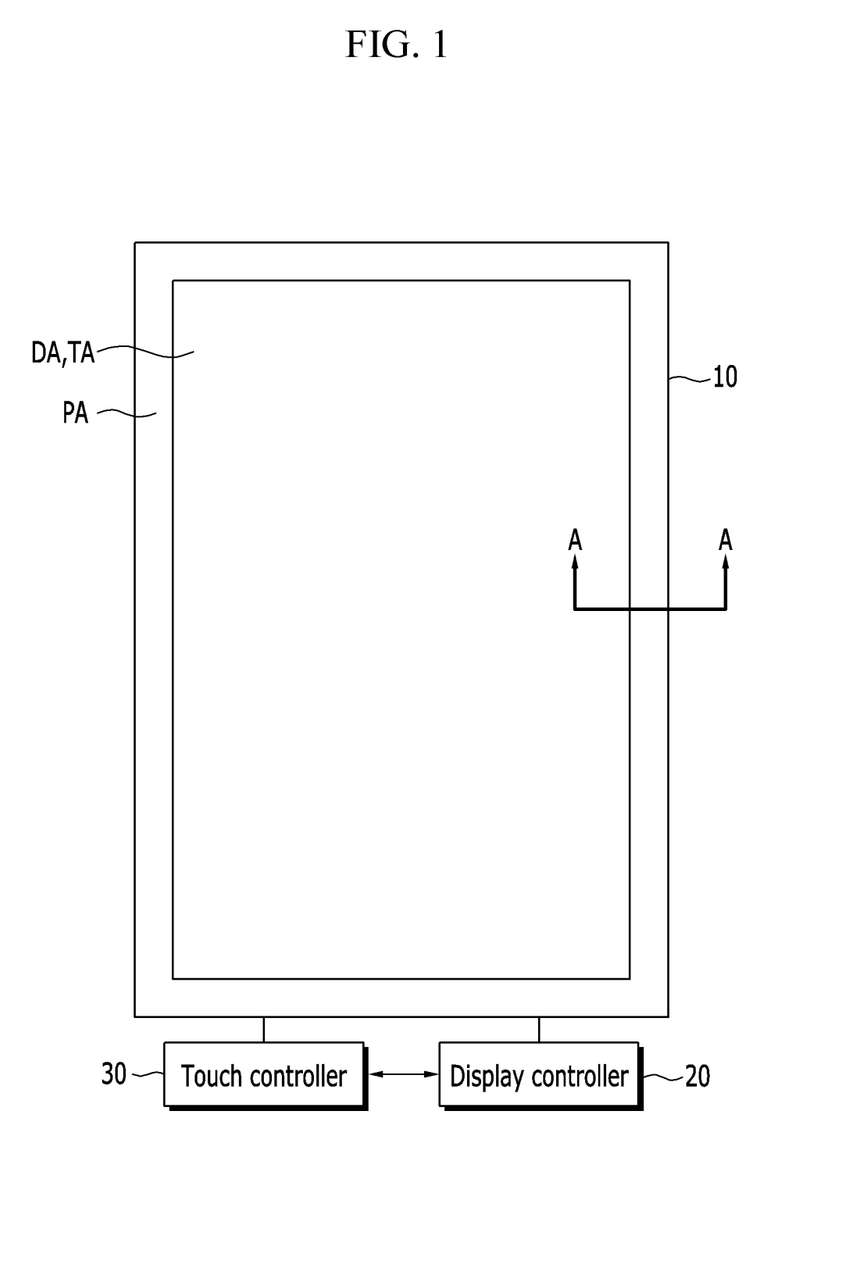
FIG. 1 is a schematic layout view of a touch panel including a touch sensor according to an exemplary embodiment.
Figure 2:
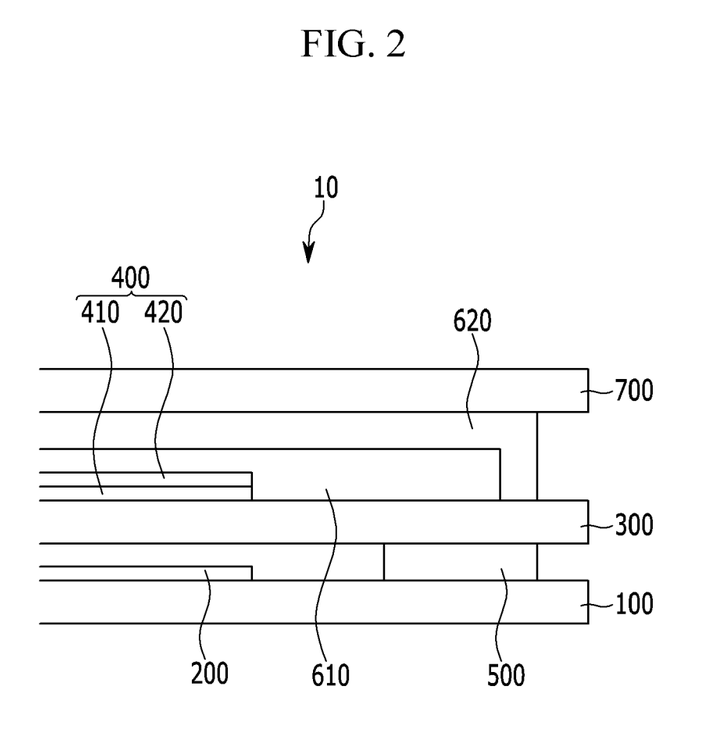
FIG. 2 is a schematic cross-sectional view of the touch panel shown in FIG. 1 taken along line A-A of FIG. 1.

FIG. 1 is a schematic layout view of a touch panel including a touch sensor according to an exemplary embodiment. FIG. 2 is a schematic cross-sectional view of the touch panel shown in FIG. 1 taken along line A-A of FIG. 1.

Referring to FIG. 1, the touch panel 10 includes a touch sensor that can sense the contact of an external object such as a finger or a pen. The touch sensor may be formed on an outer surface of a substrate of a display panel (an on-cell type) or may be formed inside the display panel (an in-cell type). Also, the touch sensor may be formed on a separate panel and is then attached to the display panel such as an OLED display or an LCD (an add-on type).

Throughout the specification, a display panel formed with a touch sensor and a separate panel including the touch sensor are each referred to as a touch panel. Hereafter, an on-cell type touch panel in which the touch sensor is formed on the outer surface of the substrate of the display panel will be described as an exemplary embodiment. However, the shape of the touch panel or the type of the display device is not limited thereto.

When the touch sensor is formed on the display panel, the touch panel 10 displays images and senses touch input. The touch panel 10 includes a display area DA where the images are displayed, a touch area sensing the touch input, and a peripheral area PA surrounding the display area DA.

Here, the touch area TA refers to an area that can sense the contact or the movement of an object that is hovering close to (a non-contact touch) in addition to the contact or the movement of an object that directly contacts the touch panel 10 (a contact touch). The touch area TA may overlap the display area DA or may define substantially the same area.

Referring to FIG. 2, the touch panel 10 includes a lower substrate 100 and an upper substrate 300 facing each other. The touch panel 10 also includes a display layer 200 formed on the lower substrate 100 and a touch electrode layer 400 forming the touch sensor on the upper substrate 300. The lower substrate 100 and the upper substrate 300 are sealed by a sealant 500 formed in the peripheral area PA.

The display layer 200 positioned on the lower substrate 100 can be formed of a transparent insulator such as glass or plastic and includes a plurality of pixels each including an electro-optical active layer. The display layer 200 further includes a plurality of display signal lines (not shown) connected to the pixels and transmitting a plurality of driving signals and is positioned in the display area DA. The display layer 200 includes a plurality of pixels and displays images via a combination of the light emitted from each of the pixels under the control of a display controller 20. When the described technology is embodied as an OLED display, the display layer 200 includes an emission layer as the optical active layer and the emission layer forms a part of an OLED.

The touch electrode layer 400 formed on the upper substrate 300 includes a first touch electrode layer 410 and a second touch electrode layer 420. The touch electrode layer 400 is positioned in the touch area TA. The first and second touch electrode layers 410 and 420 are separated from each other via an insulating layer (not shown). One of the first and second touch electrode layers 410 and 420 forms a self-capacitance type touch sensor and the other forms a mutual capacitance type touch sensor, however the described technology is not limited thereto. The first touch electrode layer 410 includes a plurality of first touch electrodes (not shown) and the second touch electrode layer 420 includes a plurality of second touch electrodes (not shown). The first and second touch electrodes have different patterns and do not substantially overlap. This will be described in greater detail below with reference to FIGS. 3 to 8.

The sealant 500 is formed in the peripheral area PA where the lower substrate 100 and the upper substrate 300 face each other. The sealant 500 may be formed as a closed loop at the periphery of the display area DA. The sealant 500 attaches the lower substrate 100 to the upper substrate 300 and prevents impurities such as moisture or oxygen from penetrating to the display layer 200 from in between the lower substrate 100 and the upper substrate 300.

When the described technology is embodied as an OLED display, the upper substrate 300 functions as an encapsulation substrate. That is, the upper substrate 300 encapsulates the OLEDs (not shown), thereby preventing moisture and/or oxygen from penetrating to the OLEDs from the environment.

Each OLED includes a pixel electrode (not shown) as an anode, a common electrode (not shown) as a cathode, and an organic emission layer (not shown) positioned therebetween. The organic emission layer may include a red organic emission layer, a green organic emission layer, and/or a blue organic emission layer which respectively emit red, green, and blue light. The red, green, and blue organic emission layers are respectively formed in the red pixel, the green pixel, and the blue pixel to realize a color image. Color images can also be formed by depositing the red, green, and blue organic emission layers together in each of the red pixel, the green pixel, and the blue pixel and forming one of a red color filter, a green color filter, and a blue color filter for each pixel.

A reflection preventing layer 610 that can reduce the reflection of external light is formed on the touch electrode layer 400. The reflection preventing layer 610 may be a polarization layer including a linear polarizer, a retarder, etc.

In the embodiment of FIG. 2, a window or transparent substrate 700 formed of glass is arranged over the reflection preventing layer 610 to protect the lower substrate 100, the display layer 200, the upper substrate 300, and the touch electrode layer 400. A light blocking layer (not shown) may be formed on a surface facing the upper substrate 300 at the edges of the window 700. The window 700 is attached to the reflection preventing layer 610 via an adhesive layer 620 including an adhesive material such as a resin.

The touch electrode layer according to an exemplary embodiment will be described with reference to FIG. 3 to FIG. 8.

Figure 3:
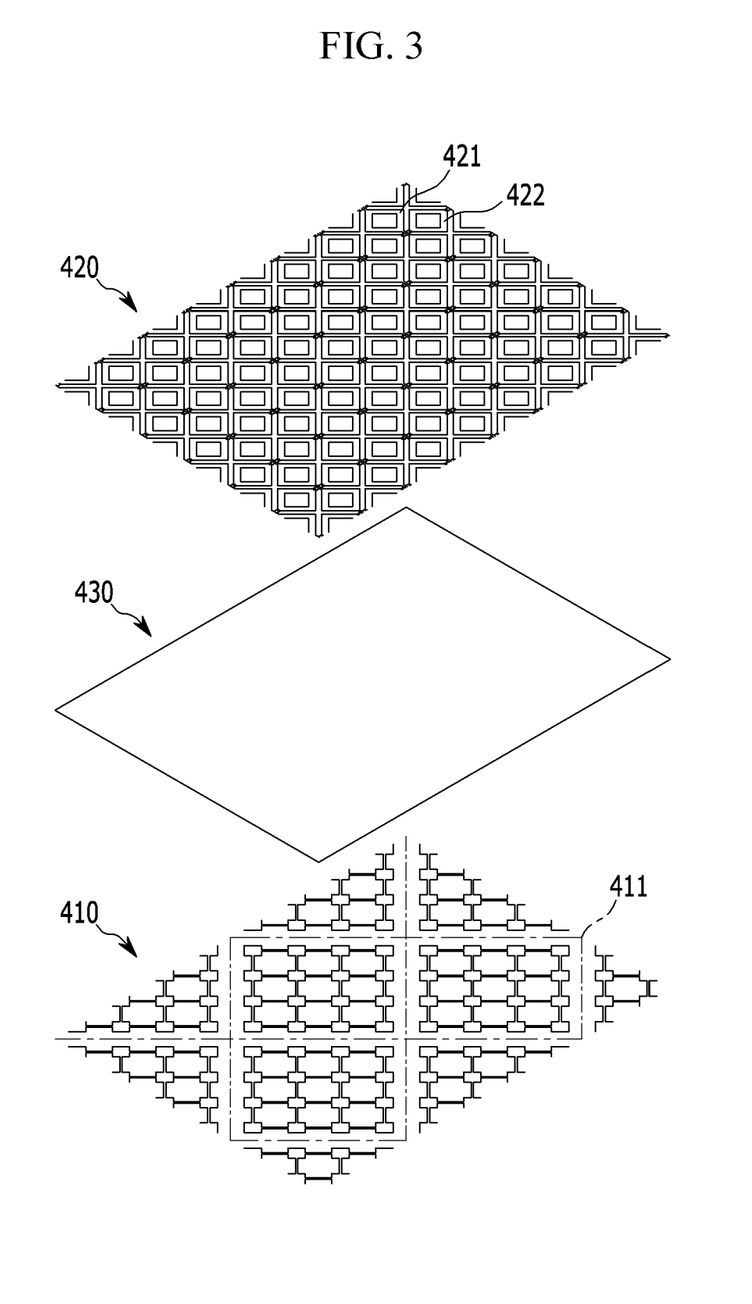
FIG. 3 is a schematic view of the layer structure of a touch sensor in a touch panel according to an exemplary embodiment.
Figure 4:
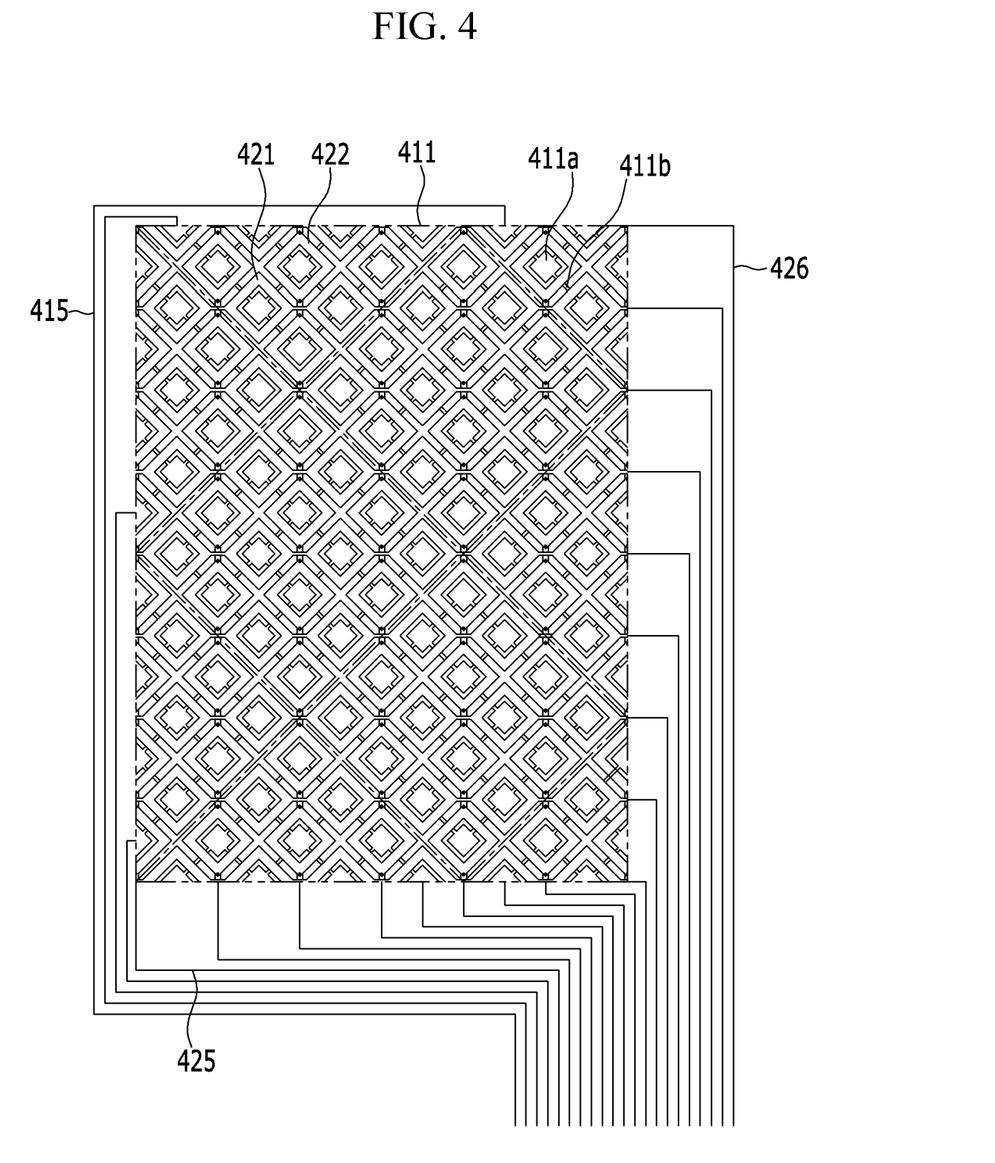
FIG. 4 is a top plan view of the touch sensor of FIG. 3.
Figure 5:
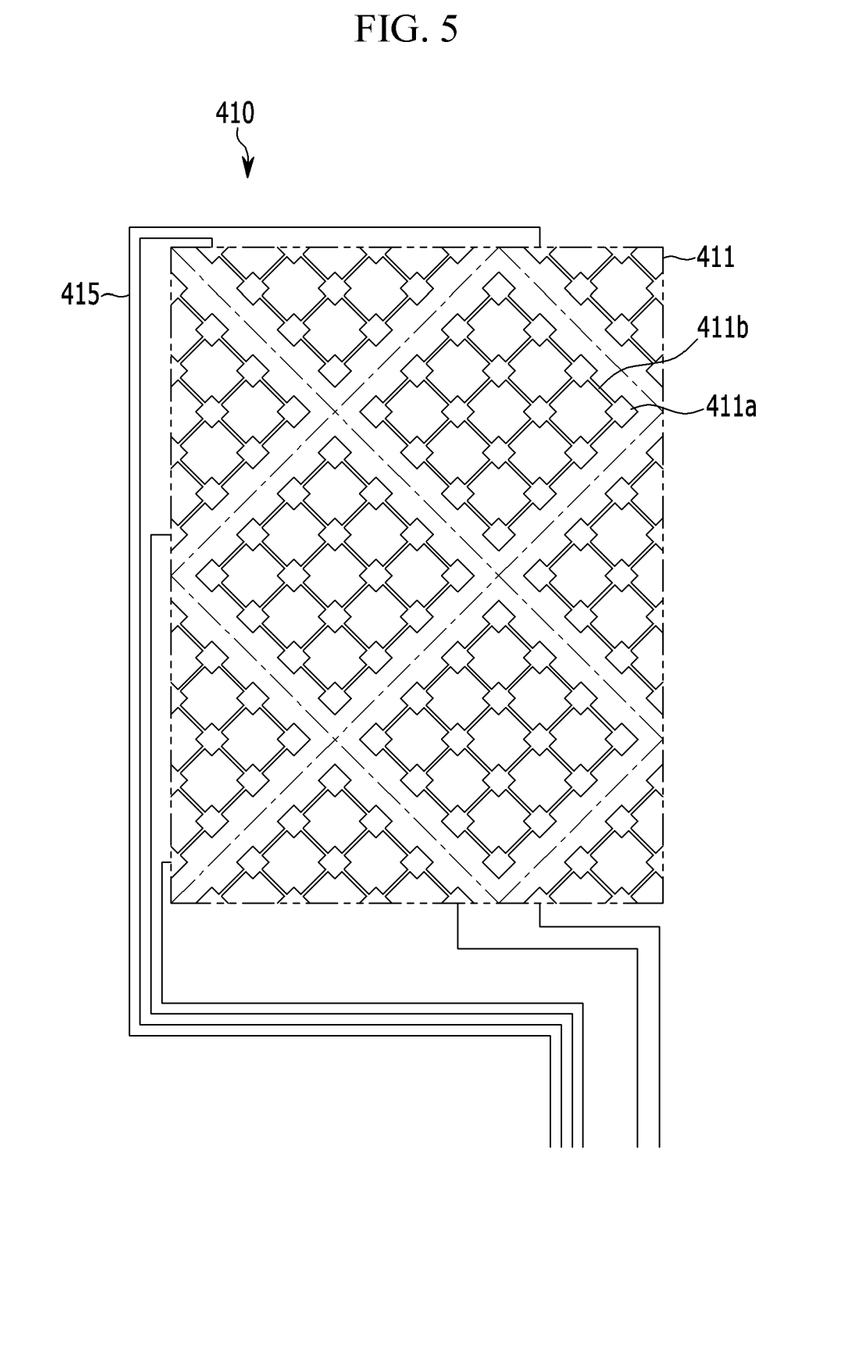
FIG. 5 is a top plan view of a first touch electrode layer in the touch sensor of FIG. 3.
Figure 6:
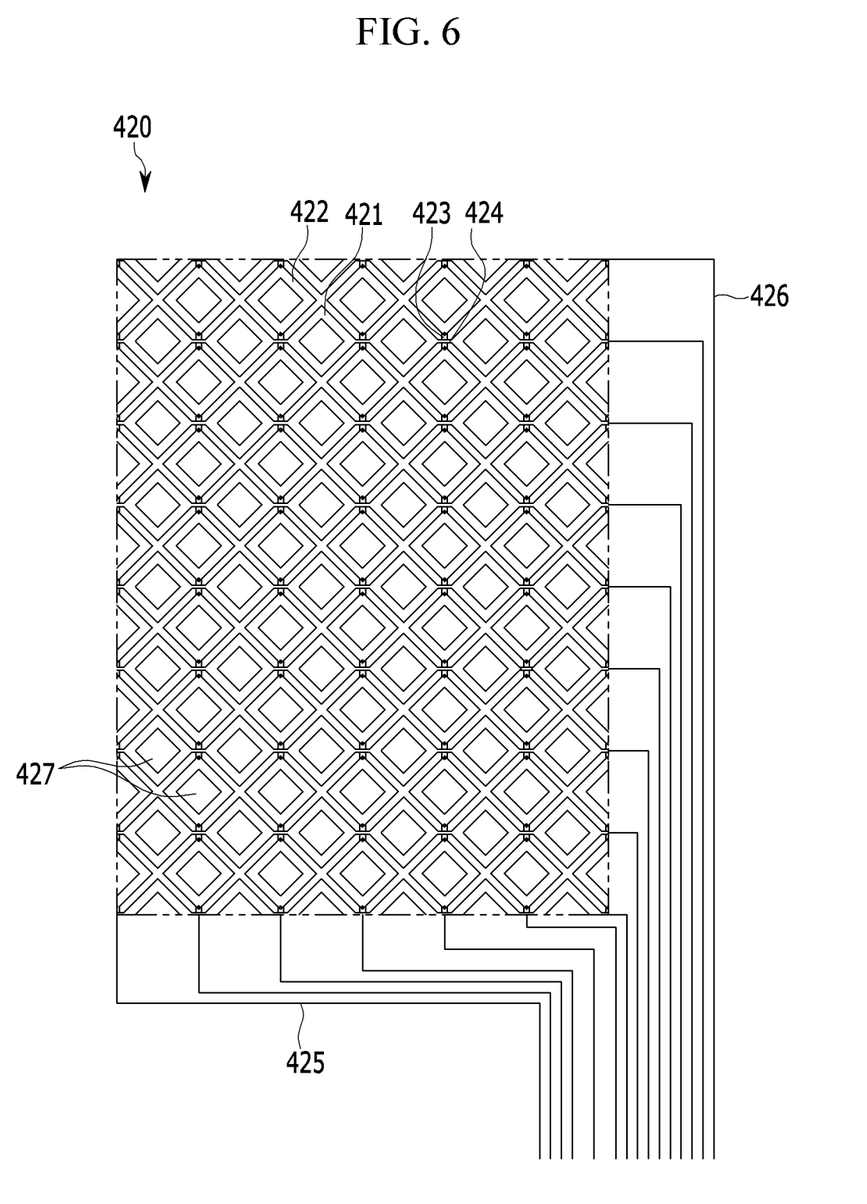
FIG. 6 is a top plan view of a second touch electrode layer in the touch sensor of FIG. 3.
Figure 7:
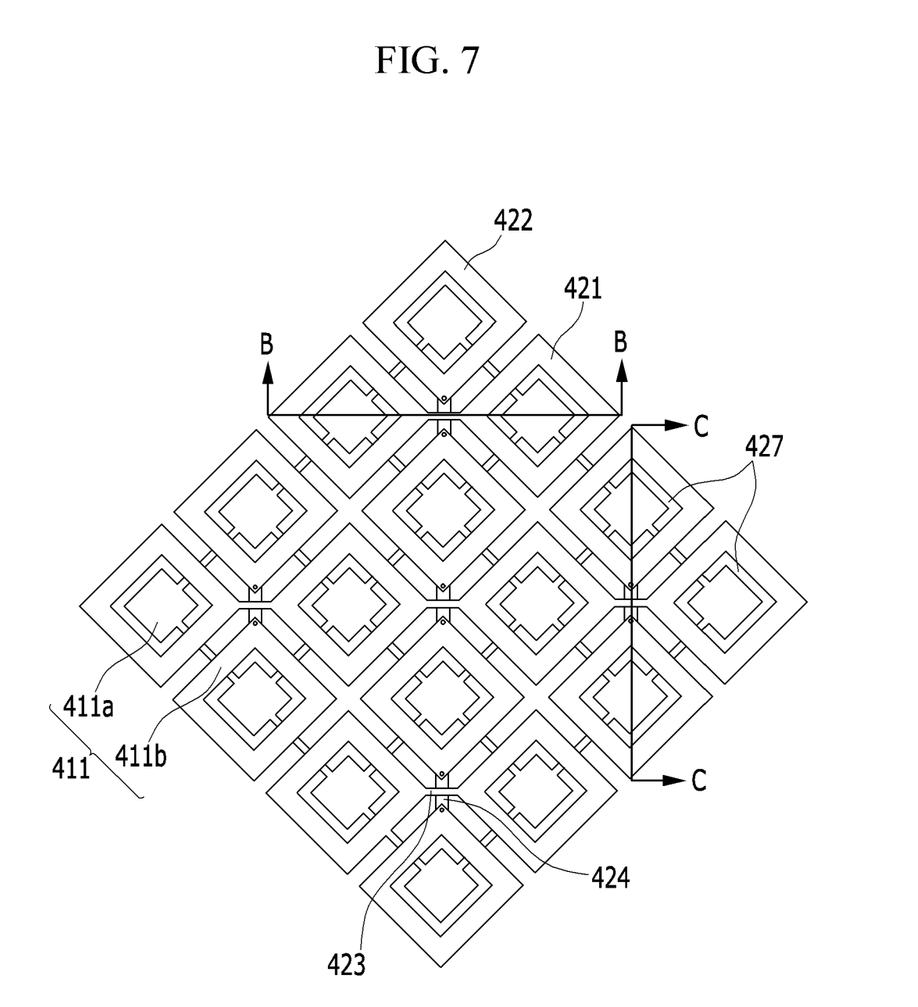
FIG. 7 is a top plan view of one electrode of the first touch electrode layer along with electrodes of the second touch electrode layer in the touch sensor of FIG. 3.
Figure 8:
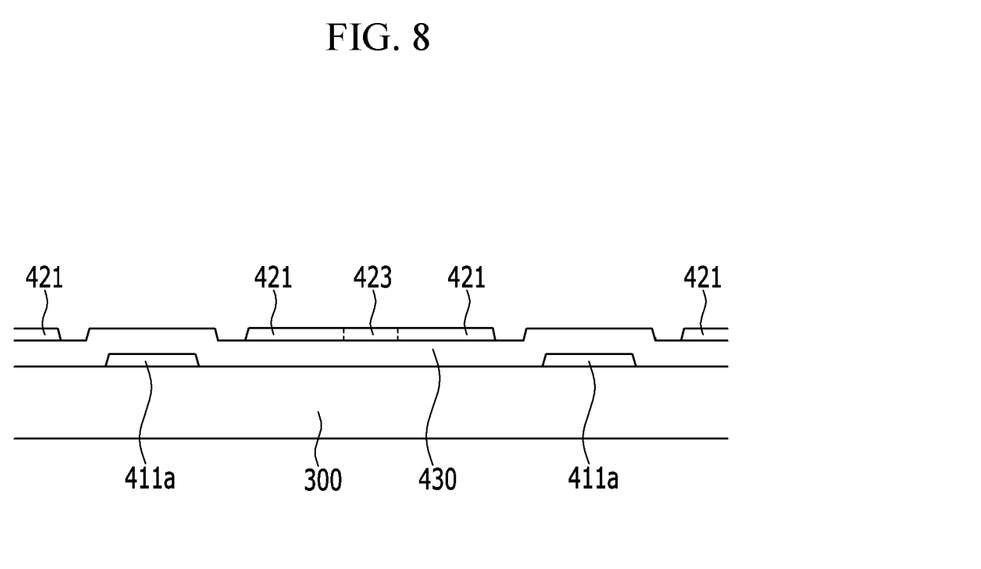
FIG. 8 is a cross-sectional view of an example taken along line B-B of FIG. 7.
Figure 9:
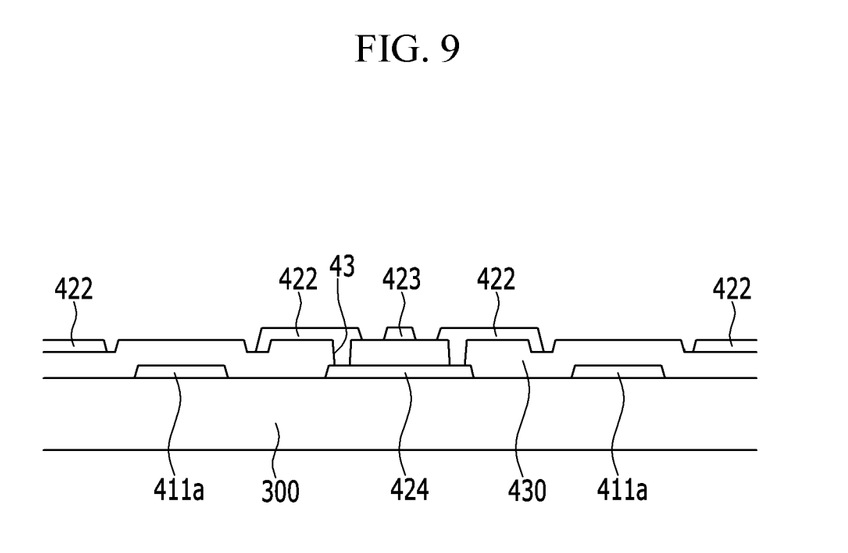
FIG. 9 is a cross-sectional view of an example taken along line C-C of FIG. 7.

FIG. 3 is a schematic view of the layer structure of a touch sensor included in a touch panel according to an exemplary embodiment. FIG. 4 is a top plan view of the touch sensor of FIG. 3. FIG. 5 is a top plan view of a first touch electrode layer in the touch sensor of FIG. 3. FIG. 6 is a top plan view of a second touch electrode layer in the touch sensor of FIG. 3. FIG. 7 is a top plan view of one electrode of the first touch electrode layer along with electrodes of the second touch electrode layer in the touch sensor of FIG. 3. FIG. 8 is a cross-sectional view of an example taken along line B-B of FIG. 7. FIG. 9 is a cross-sectional view of an example taken along a line C-C of FIG. 7.

Referring to FIG. 3, the touch electrode layer 400 includes the first touch electrode layer 410, the second touch electrode layer 420, and an insulating layer 430 positioned therebetween. The first and second touch electrode layers 410 and 420 sense the touch input by different methods. For example, the first touch electrode layer 410 may be driven by the self-capacitance method and the second touch electrode layer 420 may be driven by the mutual capacitance method. Also, the first touch electrode layer 410 may be driven to sense a non-contact touch such as hovering and the second touch electrode layer 420 may be driven to sense a contact touch, or vice versa. In FIG. 3, the first touch electrode layer 410 is positioned under the second touch electrode layer 420. The insulating layer 430 may be formed of a silicon oxide (SiOx), a silicon nitride (SiNx), or a silicon oxynitride (SiOxNy). The insulating layer (not shown) may also be formed over the second touch electrode layer 420 to protect it.

FIG. 4 to FIG. 7 show one example of the electrode pattern of the touch sensor. FIG. 4 shows the touch electrode and the touch signal line of the first and second touch electrode layers 410 and 420. FIG. 5 shows the touch electrode and the touch signal line of the first touch electrode layer 410. FIG. 6 shows the touch electrode and the touch signal line of the second touch electrode layer 420. FIG. 7 shows the relationship between one touch electrode 411 of the first touch electrode layer 410 and touch electrodes 421 and 422 of the second touch electrode layer 420.

The first touch electrode layer 410 includes a plurality of first touch electrodes 411. As shown in FIG. 5, each first touch electrode 411 is defined by a one-point chain line, and as a non-limited example, ten such first touch electrodes 411 are shown. A plurality of first touch electrodes 411 are independently connected to first touch signal lines 415 to transmit driving signals thereto. One first touch signal line 415 is formed for each first touch electrode 411. The first touch signal line 415 is primarily positioned in the peripheral area PA of the touch panel 10. The first touch signal line 415 may be formed together with second and third touch signal lines 425 and 426, that are described later, by depositing and patterning a metal material such as molybdenum (Mo), silver (Ag), titanium (Ti), copper (Cu), and/or aluminum (Al) on the upper substrate 300. According to an exemplary embodiment, the first touch electrode layer 410 is formed after forming the first to third touch signal lines 415, 425, and 526.

One first touch electrode 411 includes a plurality of sub-electrodes 411a and the sub-electrodes 411a are connected to a plurality of connections or sub-electrode connectors 411b. That is, a plurality of sub-electrodes 411a are connected via a plurality of connections 411b, thereby forming one first touch electrode 411. The sub-electrode 411a and the connection 411b may be formed of the same material. For example, a transparent conductive material such as indium tin oxide (ITO) may be deposited and patterned on the upper substrate 300 to simultaneously form the sub-electrodes 411a and the connections 411b. At this time, a second connection 424 (described in detail below) may also be formed.

One first touch electrode 411 may have an approximately quadrangular shape, for example, the basic structure of a rhombus, but is not limited thereto. When the first touch electrode 411 forms an approximate rhombus, each of the first touch electrodes 411 may include the sub-electrodes 411a arranged in a 2×2, 3×3, 4×4, 5×5, etc. matrix shape. In FIG. 7, one first touch electrode 411 includes 16 sub-electrodes 411a arranged in a 4×4 matrix shape. On the other hand, when the first touch electrodes 411 forms an approximate rhombus, the first touch electrodes 411 positioned at the corners or edges of the touch area TA may have substantially triangular shapes, an approximate right isosceles triangle.

Each sub-electrode 411a may form a quadrangle, for example, the rhombus, however it is not limited thereto, and for example, may form a polygon such as a hexagon. The sub-electrodes 411a positioned at the corners of the touch area TA may form an approximate triangle, for example, an approximate right isosceles triangle. The sub-electrodes 411a may be regularly arranged at a constant interval and as such the intervals between adjacent sub-electrodes 411a may be substantially the same.

The sub-electrode 411a has predetermined transmittance so as to transmit light emitted from the display layer 200. For example, the sub-electrode 411a may be formed of a transparent conductive material such as a thin metal layer such as indium tin oxide (ITO), indium zinc oxide (IZO), silver nanowire (AgNW), a metal mesh, and/or carbon nanotubes (CNT).

The sub-electrodes 411a of one group of the first touch electrode layer 410 are electrically connected to each other by the connections 411b to form one first touch electrode 411, thereby forming one self-capacitor Cs. The first touch signal lines 415 are respectively connected to the first touch electrodes 411, and thus the sensing input signal Tx driving the first touch electrodes 411 is input thereto and a sensing output signal Rx that is altered based on the touch input within the touch area TA is received therefrom. A plurality of first touch electrodes 411 included in the first touch electrode layer 410 can sequentially receive the sensing input signal Tx. Each first touch electrode 411 is independently driven to receive the sensing output signal Rx from each first touch electrode 411 in order to sense the touch input at a plurality of positions, that is, multi-touch input. Multi-touch input can be sensed by calculating the position (coordinates) of the first touch electrode 411 sensing the touch input of the corresponding position.

The second touch electrode layer 420 includes a plurality of second touch electrodes 421 and 422. The second touch electrodes 421 and 422 do not substantially overlap each other in the touch area TA and are alternately arranged. The second touch electrodes 421 and 422 include first electrodes 421 connected to each other in a row direction and second electrodes 422 connected to each other in a column direction. For example, the first electrodes 421 adjacent in the horizontal direction are connected by a first connection or first connector 423 to form an electrode column and the second electrodes 422 adjacent in a vertical direction are connected by a second connection or second connector 424 to form an electrode row. The first and second electrodes 421 and 422 may be positioned at the same layer, however they are electrically isolated from each other and the crossing electrode rows and columns are also electrically isolated from each other. The second touch signal line 425 is connected to one end of each electrode column and the third touch signal line 426 is connected to one end of each electrode row. The second and third touch signal lines 425 and 426 are positioned in the peripheral area PA of the touch panel 10. According to an exemplary embodiment, the touch signal lines are connected to both ends of the electrode columns and/or the electrode rows.

Each of the second touch electrodes 421 and 422 has a substantially quadrangular shape, for example, an approximate rhombus, however they are not limited thereto, and may form, for example, an approximate polygon such as an approximate hexagon.

When the second touch electrodes 421 and 422 form an approximate rhombus, the second touch electrodes 421 and 422 positioned at the corners and edges of the touch area TA form an approximate triangle, for example, an approximate right isosceles triangle. Like the first touch electrodes 411, the second touch electrodes 421 and 422 may be formed of the thin metal layer such as ITO, IZO, AgNW, the metal mesh, and the transparent conductive material such as carbon nanotubes (CNT).

Referring to FIG. 8 and FIG. 9 together showing the upper substrate 300, the first connection 423 connecting the adjacent first electrodes 421 may be positioned in the same layer as the first electrode 421 and may be formed with the same material. In contrast, the second connection 424 connecting the adjacent second electrodes 422 may be formed in a different layer from the second electrode 422 to be insulated from the first connection 423. In the FIG. 9 embodiment, the second connection 424 is formed in the same layer as the sub-electrode 411*a* of the first touch electrode layer 410 and is electrically connected to the second electrodes 422 through contact holes 43 formed in the insulating layer 430. The second connection 424 may be formed of the same material as the sub-electrode 411*a* and may be formed of the metal material used to form the first to third touch signal lines 415, 425, and 426 such as molybdenum (Mo), silver (Ag), titanium (Ti), copper (Cu), and/or aluminum (Al). According to another exemplary embodiment, the second connection 424 is formed in the same layer as the second electrode 422 and the first connection 423 is formed in a different layer from the first electrode 421, for example, the same layer as the sub-electrode 411*a*.

Each electrode column formed by the first electrodes 421 receives the sensing input signal Tx through the second touch signal lines 425 and each electrode row formed by the second electrodes 422 outputs the sensing output signals Rx through the third touch signal lines 426. Accordingly, the first and second electrodes 421 and 422 adjacent to each other form a mutual capacitor Cm. The first electrodes 421 receive the sensing input signals Tx and the second electrodes 422 output the sensing output signals Rx that are altered based on the touch input within the touch area TA in which the first and second electrodes 421 are formed. In order to sense multi-touch input, a plurality of electrode columns sequentially receive the sensing input signal Tx, and a plurality of electrode rows simultaneously output the sensing output signal Rx whenever one electrode column receives the sensing input signal Tx. According to an exemplary embodiment, the sensing input signal Tx may be input to the third touch signal line 426 and the sensing output signal Rx may be output through the second touch signal line 425.

According to an exemplary embodiment, the sensing input signal Tx is input to both the second touch signal lines 425 and the third touch signal lines 426, and accordingly, the second touch electrodes 421 and 422 are driven with the self-capacitance method. However, in this embodiment, the touch signal line is not independently connected to each second touch electrode and is driven in units formed of the electrode columns and the electrode rows. Thus, when sensing multi-touch input, the multi-touch is not sensed due to a ghost touch coordinate when calculating the coordinates based on the sensing output signal Rx.

In an exemplary embodiment, the second touch electrodes 421 and 422 have an opening 427 (see FIG. 7). That is, the second touch electrodes 421 and 422 define an opening where the electrode is not formed. The opening 427 is formed at a position overlapping the sub-electrode 411*a* of the first touch electrode 411 of the first touch electrode layer 410. For example, as shown in FIG. 7, the second touch electrodes 421 and 422 each include openings 427 overlapping the sub-electrode 411*a* of the first touch electrode 411. Accordingly, when driving the second touch electrodes 421 and 422, coupling with the first touch electrode 411 can be prevented or minimized, and as a result, characteristic degradation of the touch sensors can be prevented.

The number of sub-electrodes 411*a* of the first touch electrode layer 410 can be the same as the number of second touch electrodes 421 and 422 of the second touch electrode layer 420 and the sub-electrodes 411*a* may correspond to the openings 427 of the second touch electrode 421 and 422 at a ratio of 1:1. The openings 427 may have substantially the same shape as the sub-electrodes 411*a* (e.g., when the sub-electrode has a substantially rhombus shape, the opening also has a substantially rhombus shape). The configuration of the sub-electrodes 411*a* and the openings 427 as described above is advantageous in terms of overall space usage efficiency of the touch area TA and the touch input can be sensed at all positions of the touch area TA.

A principle and a method of sensing touch input by the self-capacitance method and the mutual capacitance method will now be described with reference to FIG. 10 as well as FIG. 3 to FIG. 7.

Figure 10:
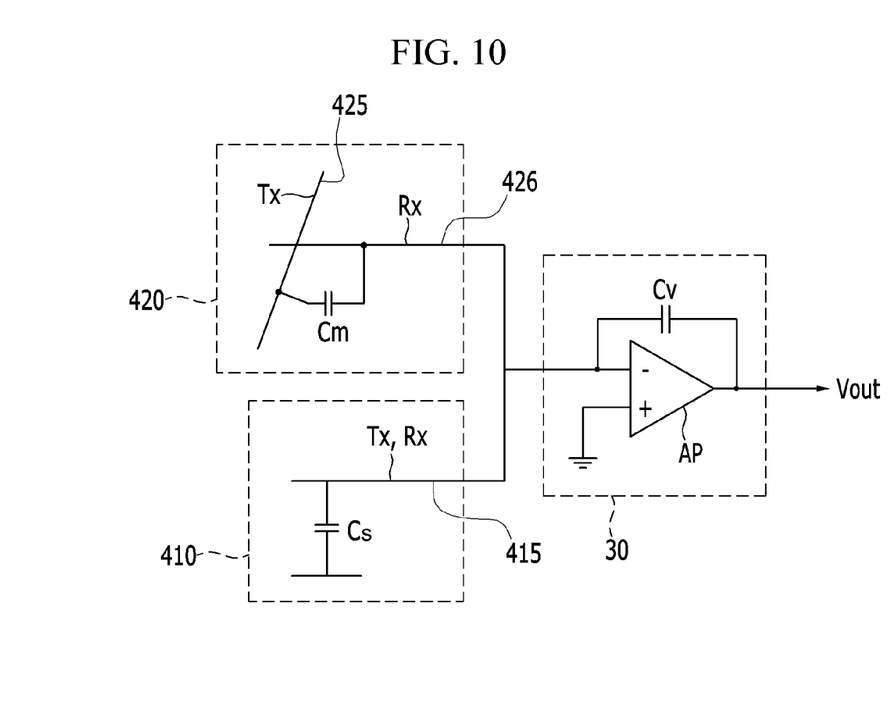
FIG. 10 is a circuit diagram of a touch sensor and a touch controller according to an exemplary embodiment.

FIG. 10 is a circuit diagram of a touch sensor and a touch controller according to an exemplary embodiment.

As described above, the touch sensor of the first touch electrode layer 410 senses touch input with a self-capacitance method by each first touch electrode 411 and the touch sensor of the second touch electrode layer 420 senses touch input with a mutual capacitance method by the adjacent second touch electrodes 421 and 422. The touch electrodes 411, 421, and 422 of the touch electrode layers 410 and 420 are connected to the touch controller 30 through the touch signal lines 415, 425, and 426. The touch electrodes 411, 421, and 422 receive the sensing input signal Tx from the touch controller 30 through the touch signal lines 415 and 425 and transmit the sensing output signal Rx to the touch controller 30 through the touch signal lines 415 and 426. For the first touch electrodes 411, the sensing input signal Tx is input through the first touch signal lines 415 and the sensing output signal Rx is output through the same first touch signal lines 415. For the second touch electrodes 421 and 422, the first electrodes 421 receives the sensing input signal Tx through the second touch signal lines 425 and the second electrodes 422 outputs the sensing output signal Rx through the third touch signal lines 426.

First, referring to the mutual capacitance method, the sensing input signal Tx applied to the first electrode 421 may have various waveforms and voltage levels, and for example, may include a pulse that is periodically output, or at least two voltage levels. A DC voltage may be applied to the second electrode 422. For example, the sensing input signal Tx may be a square wave that swings from about 0 V to about 3 V and the DC voltage may be about 1.5 V. Although the second electrode 422 is applied with the DC voltage, the voltage of the second electrode 422 is altered due to coupling with the sensing input signal Tx and is output as the sensing output signal Rx. The first electrodes 421 and the second electrodes 422 form the mutual capacitor Cm, and when touch input of a finger or a pen is generated, the charge amount stored in the mutual capacitor Cm is altered according to the potential difference between the first and second electrodes 421 and 422. As a result, the width of the voltage signal of the sensing output signal Rx is altered. The touch controller 30 receives and processes the sensing output signal Rx having this alteration to generate the touch information such as the existence of touch input and the touch position thereof. The touch controller 30 includes a plurality of amplifiers AP connected to the touch signal lines 415 and 426. Each of the amplifiers AP is connected to a capacitor Cv between an inversion terminal (−) and an output terminal of the amplifier AP. A non-inversion terminal (+) of the amplifier AP is connected to a predetermined voltage such as a ground voltage and the inversion terminal (−) of the amplifier AP is connected to the touch signal lines 415 and 426. The amplifier AP acts as a current integrator and integrates the sensing output signal Rx over a predetermined time (e.g., one frame) to generate a touch information signal Vout.

The self-capacitance method is similar to the mutual capacitance method, however the self-capacitance method uses the self-capacitor Cs formed with the common electrode of the pixel, not a capacitor formed between adjacent first touch electrodes 411. Accordingly, in contrast to the mutual capacitor Cm substantially formed in the horizontal direction (e.g., substantially in the plane of the touch sensor), the self-capacitor Cs is substantially formed in the vertical direction (e.g., substantially perpendicular to the plane of the touch sensor). Also, the first touch electrode 411 receives the sensing input signal Tx and outputs the sensing output signal Rx. The sensing input signal Tx may be a pulse that is periodically output, for example. When the sensing input signal Tx is applied to the first touch electrode 411, the self-capacitor Cs is charged from the sensing input signal Tx and the first touch electrode 411 outputs the sensing output signal Rx. In absence of touch input, the charge amount in the self-capacitor Cs is not altered such that the first touch electrode 411 outputs the same sensing output signal Rx as the sensing input signal Tx. However, when the touch input is generated, the charge amount is altered such that the sensing output signal Rx is correspondingly altered. The touch controller 30 processes this change in charge as described above to generate the touch information signal Vout.

The touch panel according to an exemplary embodiment may be driven to sense touch input by the self-capacitance method and the mutual capacitance method. For example, the first touch electrode 411 of the first touch electrode layer 410 is driven with the self-capacitance method during a first period for each frame and the touch electrodes 421 and 422 of the second touch electrode layer 420 are driven with the mutual capacitance method during a second period. For this, the touch controller 30 may transmit the sensing input signal Tx to the first touch electrode layer 410 and may receive the sensing output signal Rx during the first period. Thereafter, the touch controller 30 may transmit the sensing input signal Tx to the second touch electrode layer 420 and the sensing output signal Rx during the second period. During the second period, the touch controller 30 may process the sensing output signal Rx transmitted from the first touch electrode layer 410 during the first period to generate the first touch information signal (e.g., the touch information signal for the non-contact touch). Similarly, during the first period, the touch controller 30 may process the sensing output signal Rx transmitted from the second touch electrode layer 420 during the second period to generate the second touch information signal (e.g., the touch information signal for the contact touch). That is, the touch controller 30 may generate the second touch information signal while the first electrode layer is driven and the first touch information signal while the second electrode layer is driven for each frame.

Next, a pixel of the touch panel according to an exemplary embodiment will be described.

Figure 11:
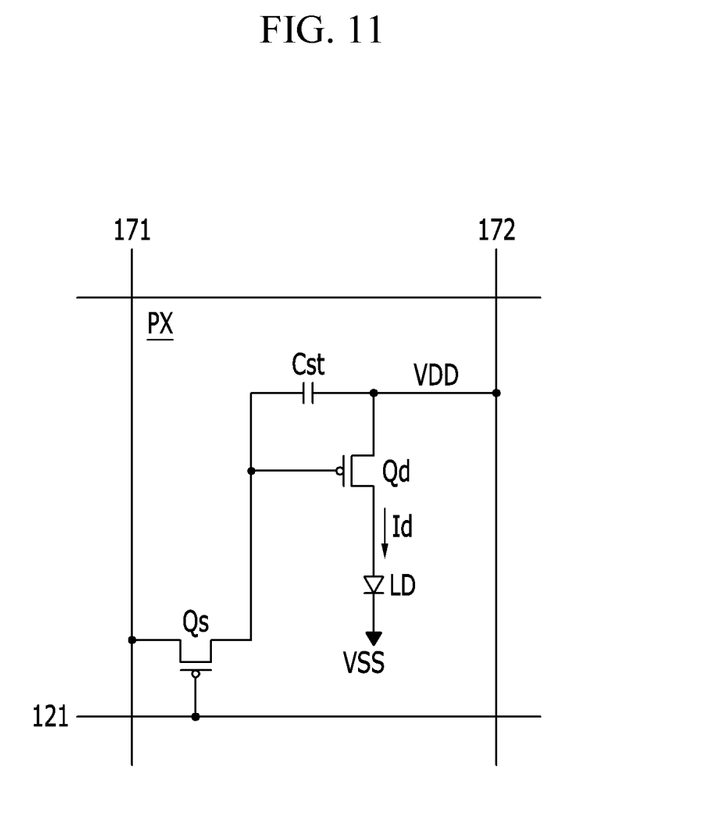
FIG. 11 is an equivalent circuit diagram of one pixel in a touch panel according to an exemplary embodiment.

FIG. 11 illustrates an equivalent circuit diagram of one pixel in a touch panel according to an exemplary embodiment.

The display layer 200 of the touch panel includes a plurality of switching and driving thin film transistors Qs and Qd, a plurality of storage capacitors Cst, and a plurality of light-emitting elements LD. That is, the display layer 200 includes a plurality of pixels. Each pixel is connected to a plurality of signal lines 121, 171, and 172 and the pixels are arranged in a matrix.

The signal lines include a plurality of gate lines 121 transmitting gate signals, a plurality of data lines 171 transmitting data signals, and a plurality of driving voltage lines 172 transmitting a driving voltage VDD. The gate signal lines 121 extend in a row direction and are substantially parallel to each other and the data lines 171 and the driving voltage lines 172 extend in a column direction and are substantially parallel to each other. The gate signals and the data signals may be applied through a display controller.

Each pixel PX includes a switching thin film transistor Qs, a driving thin film transistor Qd, a storage capacitor Cst, and a light-emitting element LD.

The switching thin film transistor Qs includes a control terminal, an input terminal, and an output terminal. The control terminal is connected to the gate line 121, the input terminal is connected to the data line 171, and the output terminal is connected to the driving thin film transistor Qd. The switching thin film transistor Qs transfers the data signal applied to the data line 171 to the driving thin film transistor Qd in response to the gate signal applied to the gate line 121.

The driving thin film transistor Qd also has a control terminal, an input terminal, and an output terminal. The control terminal is connected to the switching thin film transistor Qs, the input terminal is connected to the driving voltage line 172, and the output terminal is connected to the light-emitting element LD. The driving thin film transistor Qd applies an output current Id to the light-emitting element LD having a magnitude which varies depending on the voltage applied between the control terminal and the output terminal of the driving thin film transistor Qd.

The storage capacitor Cst is connected between the control terminal and the input terminal of the driving thin film transistor Qd. The storage capacitor Cst stores the data signal applied to the control terminal of the driving thin film transistor Qd and maintains the data signal even after the switching thin film transistor Qs is turned off.

The light-emitting element LD which may be an organic light-emitting diode (OLED) includes an anode which is connected to the output terminal of the driving thin film transistor Qd and a cathode which is connected to a common voltage VSS. The light-emitting element LD displays images by emitting light having a luminance which varies depending on the output current Id of the driving thin film transistor Qd.

The switching thin film transistor Qs and the driving thin film transistor Qd may be n-channel field effect transistors (FET) or p-channel field effect transistors. The connection relationship between the switching and driving thin film transistors Qs and Qd, the storage capacitor Cst, and the light-emitting element LD can be variously altered.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device including a display panel and a touch panel, the touch panel comprising;
   a substrate;
   a first touch electrode layer and a second touch electrode layer formed over the substrate; and
   an insulating layer interposed between the first and second touch electrode layers,
   wherein the first touch electrode layer includes a plurality of first touch electrodes each configured to independently receive a driving signal, wherein each of the first touch electrodes includes i) a plurality of sub-electrodes arranged at a predetermined interval and ii) a plurality of sub-electrode connectors electrically connecting the sub-electrodes to each other, wherein each of the sub-electrodes has a width that is larger than that of each of the sub-electrode connectors, wherein the display panel is farther from the second touch electrodes than the first touch electrodes, wherein the second touch electrode layer includes a plurality of second touch electrodes and wherein the second touch electrodes include i) a plurality of first electrodes electrically connected to each other in a first direction and ii) a plurality of second electrodes electrically connected to each other in a second direction crossing the first direction.

2. The display device of claim 1, wherein the first electrodes are arranged in a plurality of rows extending in the first direction, wherein the second electrodes are arranged in a plurality of columns extending in the second direction and wherein the first and second electrodes are electrically insulated from each other.

3. The display device of claim 2, wherein each of the second touch electrodes defines an opening therein.

4. The display device, of claim 3, wherein each of the sub-electrodes of the first touch electrodes overlaps a corresponding one of the openings of the second touch electrodes.

5. The display device of claim 4, wherein the area defined by each of the openings is greater than the area of each of the sub-electrodes.

6. The display device of claim 4, wherein the number of the sub-electrodes of the first touch electrodes is the same as the number of the second touch electrodes.

7. The display device of claim 6, further comprising a plurality of first touch signal lines respectively electrically connected to the first touch electrodes.

8. The display device of claim 7, wherein each of the first touch signal lines is configured to transmit a sensing input signal to the corresponding first touch electrode and receive a sensing output signal from the corresponding first touch electrode.

9. The display device of claim 7, further comprising i) a plurality of second touch signal lines respectively electrically connected to the second electrode columns and ii) a plurality of third touch signal lines respectively electrically connected to the first electrode rows.

10. The display device of claim 9, wherein the third touch signal lines are configured to transmit a plurality of sensing input signals and wherein the second touch signal lines are configured to receive a plurality of sensing output signals.

11. The display device of claim 1, wherein each of the sub-electrodes has a substantially rectangular or triangular shape and wherein the intervals between the sub-electrodes are substantially the same.

12. The display device of claim 11, wherein each of the sub-electrode connectors is formed in the same layer as the first touch electrodes and is formed of the same material as the first touch electrodes.

13. The display device of claim 1, wherein each of the second touch electrodes has a substantially rectangular or triangular shape and wherein the intervals between the second touch electrodes are substantially the same.

14. The display device of claim 13, wherein the first electrodes are electrically connected to each other via a plurality of first connectors formed in the same layer as the first electrodes and wherein the second electrodes are electrically connected to each other via a plurality of second connectors electrically insulated from the first connectors.

15. The display device of claim 14, wherein the second connectors are formed in the same layer as the first touch electrodes and are formed of the same material as the first touch electrodes.

16. The display device of claim 15, wherein the second connectors are electrically connected to the second electrodes via a plurality of contact holes formed in the insulating layer.

17. The display device of claim 1, further comprising a base substrate formed below the substrate and a display layer interposed between the base substrate and the substrate.

18. A display device, comprising:

a display panel; and a touch panel formed over the display panel, wherein the touch panel includes:

a substrate;

a plurality of first touch electrodes formed over the substrate wherein each of the first touch electrodes is configured to receive a first input signal and output a first output signal, wherein each of the first touch electrodes includes i) a plurality of sub-electrodes arranged at a predetermined interval and ii) a plurality of sub-electrode connectors electrically connecting the sub-electrodes to each other, and wherein each of the sub-electrodes has a width that is larger than that of each of the sub-electrode connectors; and a plurality of second and third touch electrodes formed over the first touch electrodes, wherein the second touch electrodes are configured to receive a second input signal, wherein the third touch electrodes are configured to output a second output signal, wherein the display panel is farther from the second touch electrodes than the first touch electrodes, wherein the second touch electrodes are electrically connected to each other in a first direction, and wherein the third touch electrodes are electrically connected to each other in a second direction crossing the first direction.

19. The display device of claim 18, wherein each of the second and third touch electrodes defines an opening and wherein each of the openings overlaps one of the sub-electrodes.

* * * * *